United States Patent [19]

Ito

[11] 4,042,410
[45] Aug. 16, 1977

[54] METHOD FOR DEFOAMING MOLTEN SLAG

[75] Inventor: Haruo Ito, Imaichi, Japan

[73] Assignee: Aikoh Co., Ltd., Tokyo, Japan

[21] Appl. No.: 631,068

[22] Filed: Nov. 12, 1975

[51] Int. Cl.² .............................................. C04B 7/14
[52] U.S. Cl. ..................................................... 106/117
[58] Field of Search .................. 106/117; 75/24, 30, 75/53, 57, 96

[56] References Cited

U.S. PATENT DOCUMENTS

| | | | |
|---|---|---|---|
| 3,051,564 | 8/1962 | Drenning | 75/53 |
| 3,585,025 | 6/1971 | Obst et al. | 75/53 |

*Primary Examiner*—J. Poer
*Attorney, Agent, or Firm*—Fay & Sharpe

[57] ABSTRACT

A method for defoaming molten slag by throwing onto the bubbling surface of the slag a molding consisting of 17–72% by weight of organic material, 20–80% by weight of refractory material and 3–15% by weight of a binder to dissipate the formed bubbles.

3 Claims, No Drawings

METHOD FOR DEFOAMING MOLTEN SLAG

The present invention relates to an improvement in a method for defoaming molten slag.

It is required to eliminate the foaming in molten slag in the furnace because said foaming makes such operations as sampling, temperature measurement of melt and pouring of the melt difficult and the checking up of conditions in refining process becomes indistinct. The foaming in molten slag occurs because of the fact that when the CO bubbles which were generated by a reaction of carbon with oxygen to enter into the slag, escape out of the slag, said bubbles are included in the slag owing to the influence of viscosity, thickness, quantity of the slag, and that the quantity of the bubbles which are transferred from molten iron becomes greater than that of the bubbles which are discharged from the slag, whereby expanding the entire slag. Such foaming phenomenon occurs mostly at the oxygen blowing last period when the viscosity of said slag increases, in short near the pouring if referred to converter.

In conventional methods of eliminating foams of molten slag there is thrown either raw wood onto the melt surface to break the foam surface by generating gas or a heavy block such as bricks and mouldable refractory block to cool the foam surface and break the foams mechanically. However, in most cases the former disappear in the surface of the foams due to its light weight, and the latter may solidify the slag depending upon the conditions of the furnace and sometimes makes the separation of slag disadvantageous, thus both the cases giving no sufficient effect.

This invention is to provide a method of carrying out usual refining operations by throwing a moulding which serves both for generating gas and as a heavy weight and which enters into slag simultaneously with its throwing to generate gas and defoam. That is, the invention is to remove the foams by throwing onto the surface of foaming slag a moulding consisting of 17-72% by weight of organic material, 20-80% by weight of refractory material and 3-15% by weight of a binder.

The organic material to be used has an effect that it is decomposed and burned by high temperature to generate gas and break the membranes of foams. It is selected from among wood chips, wood powder, rice hulls baked waste sludge, dried waste obtained in the manufacture of paper, and minerals such as coal, tar and pitch. The organic material of less than 17% by weight presents insufficient gas generation and that exceeding 72% by weight may decrease the weight of said moulding, both the cases being improper.

The refractory material is employed to give a weight to the moulding, and it should be as greater in specific gravity as possible, although any kind of refractory might be all right if it gives a weight of more than a certain degree to said moulding. As the exammples of the refractory materials there are mentioned natural ores such as siliceous sands, silica, grog, clay, olivine, lime stone, dolomite, magnesite, bauxite, alumina, and the mixtures thereof. One or more of said materials are regulated in constitution each time when refining process is carried out, so that it may not give influence in any bad way upon the molten steel in the furnace. As regards mixing proportion of said refractory material, with less than 20% by weight the weight of the whole moulding will be short even if the material is of heavy one, and with more than 80% by weight the other components, particularly the organic material will be short whereby diminishing the effect of generating gas.

The object of the binder used in the invention is to provide a shaping power when making moulding, and as the binder there may be mentioned aqueous solution of organic binders such as starches, resins, sugars and proteins, or solutions of organic solvents, or aqueous solution of inorganic binders such as water glass, aluminum phosphate and colloidal silica. In the mixing proportion of the binder of less than 3% by weight there is a fear that binding power resisting heat is weak and the moulding may break away before it sinks into the foaming slag, and float up to the surface. Even exceeded 15% by weight there is obtained only the effect same as in the case of 15% by weight.

Said mixture is put into a mould for moulding by compression, suction and other steps to prepare a block-like product.

When thrown onto the surface of foaming slag said product is settled into the foams because of its weight, generates gas in the foams and breaks the membranes of said foams to sink the slag. It is free to select the shape and size of said moulding according to the size of furnace.

The following is an Example of the invention in which a 100 ton converter is employed.

Table 1

| Example | | | (% by weight) | |
|---|---|---|---|---|
| Constituents | A | B | C | D |
| Wood powder | 25 | 18 | 13 | — |
| Pulp | — | 21 | 20 | 17 |
| Waste sludge in paper manufacturing | 10 | 20 | — | — |
| Baked waste sludge | — | 13 | 12 | — |
| Silica sand | 10 | — | — | 30 |
| Lime stone | 50 | 20 | 40 | 50 |
| Phenol resin | — | 8 | 10 | 3 |
| Water glass | 5 | — | 5 | — |

Table 2

| Example | A | B | C | D |
|---|---|---|---|---|
| Shapes | Square pillar Length 70 mm Width 70 mm Height 400 mm | Square pillar Length 65 mm Width 65 mm Height 550 mm | Block | Block |
| Throwing method | 5 pillars were thrown into the converter after oxygen blowing | 5 pillars were thrown into the converter after oxygen blowing | 2.5kg block filled in kraft bag was thrown into the converter | 2.5kg block filled in kraft bag was thrown into the converter |
| Control effect of slag bubbling | Good | Good | Good | Good |
| Remarks | Sampling or temperature measuring was possible in | Sampling or temperature measuring was possible in | Sampling or temperature measuring was possible in | Sampling or temperature measuring was possible in |

Table 2-continued

| Example | A | B | C | D |
|---|---|---|---|---|
| | about a minute after throwing | about 2 minutes after throwing | 1.30 minutes after throwing | 1.30 minutes after throwing |

It will be clear from the above Tables that each operation of the furnace could be easily carried out.

What I claim is:

1. A method for defoaming molten slag by throwing onto the bubbling surface of the slag a moulding consisting of 17 to 72 percent by weight of organic material selected from the group consisting of wood chips, wood powder, rice hulls, coal, tar and pitch and mixtures thereof; 20 to 80 percent by weight of a refractory material selected from the group consisting of silica, grog, clay, olivine, lime stone, dolomite, magnesite, bauxite, alumina and mixtures thereof; and 3 to 15 percent by weight of a binder selected from the group consisting of starches, resins, sugars, proteins, water glass, aluminum phosphate, colloidal silica and mixtures thereof, whereby said moulding disintegrates to cause bubbles present in said molten slag to dissipate.

2. The method of defoaming molten slag of claim 1 wherein a plurality of mouldings are utilized.

3. The method of defoaming molten slag of claim 2 wherein said mouldings have a generally rectangular cross-section.

* * * * *